US010975274B2

(12) United States Patent
Kim et al.

(10) Patent No.: US 10,975,274 B2
(45) Date of Patent: Apr. 13, 2021

(54) ACRYLIC ADHESIVE AND PROTECTIVE FILM INCLUDING THE SAME

(71) Applicants: SAMSUNG DISPLAY CO., LTD., Yongin-si (KR); DONGGUAN DYT ELECTRONIC TAPE CO., LTD., DongGuan (CN)

(72) Inventors: Sung Kim, Yongin-si (KR); Hyun Sook Kim, Yongin-si (KR); Jang Hwan Jeong, Yongin-si (KR); Sung Chan Jo, Yongin-si (KR); Kyung Lae Rho, Yongin-si (KR); Soo Im Jeong, Yongin-si (KR); Oh Jung Kwon, DongGuan (CN); Sung Hwan Kim, DongGuan (CN); Oh Nam Kwon, DongGuan (CN); Jae Gwan Lee, Osan-si (KR); Jung Hun Kim, Incheon (KR)

(73) Assignees: SAMSUNG DISPLAY CO., LTD., Yongin-si (KR); DONGGUAN DYT ELECTRONIC TAPE CO., LTD., Dongguan (CN)

( * ) Notice: Subject to any disclaimer, the term of this patent is extended or adjusted under 35 U.S.C. 154(b) by 0 days.

(21) Appl. No.: 15/654,943

(22) Filed: Jul. 20, 2017

(65) Prior Publication Data
US 2018/0022973 A1 Jan. 25, 2018

(30) Foreign Application Priority Data

Jul. 22, 2016 (KR) .................. 10-2016-0093124

(51) Int. Cl.
C09J 133/06 (2006.01)
C09J 7/20 (2018.01)
B32B 7/06 (2019.01)
B32B 7/12 (2006.01)
B32B 27/30 (2006.01)
C09J 11/04 (2006.01)
C09J 11/08 (2006.01)

(52) U.S. Cl.
CPC ............ *C09J 133/066* (2013.01); *B32B 7/06* (2013.01); *B32B 7/12* (2013.01); *B32B 27/308* (2013.01); *C09J 7/20* (2018.01); *C09J 11/04* (2013.01); *C09J 11/08* (2013.01); C08L 2203/206 (2013.01); C08L 2312/00 (2013.01); C09J 2425/00 (2013.01); C09J 2433/00 (2013.01); C09J 2481/00 (2013.01)

(58) Field of Classification Search
CPC .... C09J 133/066; C09J 133/06; C09J 133/08; C09J 133/10; C09J 2433/00; C09J 11/04; C09J 11/08
See application file for complete search history.

(56) References Cited

U.S. PATENT DOCUMENTS

| 4,505,976 A * | 3/1985 | Doehnert ............... A61L 24/043 428/355 CP |
| 5,266,609 A * | 11/1993 | Hall ......................... A61K 6/30 523/116 |
| 6,750,285 B1 * | 6/2004 | Stewart ................ C09D 133/06 523/177 |
| 9,562,172 B2 * | 2/2017 | Koga ........................ C09J 7/00 |
| 9,798,184 B2 | 10/2017 | Yoon et al. |
| 9,816,011 B2 | 11/2017 | Kim et al. |
| 2002/0127361 A1 * | 9/2002 | Sandt ........................ B32B 7/12 428/40.1 |
| 2011/0104508 A1 * | 5/2011 | Wang ....................... C09D 4/06 428/522 |
| 2012/0321819 A1 * | 12/2012 | Kim ....................... C09J 133/08 428/1.1 |
| 2013/0098441 A1 * | 4/2013 | Yamaguchi ........ C08G 18/6229 136/256 |
| 2014/0016067 A1 * | 1/2014 | Yoon ...................... C09J 133/06 349/96 |
| 2014/0099504 A1 | 4/2014 | Yoshida et al. |
| 2014/0377551 A1 | 12/2014 | Kataoka et al. |
| 2015/0024218 A1 * | 1/2015 | Koga ..................... C09J 175/16 428/423.1 |
| 2016/0099470 A1 | 4/2016 | Kwon et al. |

FOREIGN PATENT DOCUMENTS

| CN | 102884148 | 1/2013 |
| CN | 103013401 | 4/2013 |
| CN | 103429691 | 12/2013 |
| CN | 103492513 | 1/2014 |
| CN | 104250538 | 12/2014 |
| EP | 2527416 A2 | 11/2012 |

(Continued)

OTHER PUBLICATIONS

Machine Translation of JP 2008-050507A (Year: 2008).*
Machine translation of JP 07-109446A (Year: 1995).*
Extended European Search Report was issued from the European Patent Office dated Nov. 24, 2017 with respect to the European Patent Application No. 17181867.7.
"Particle size analysis", Wikipedia, URL: https://en.wikipedia.org/wiki/Particle_size_analysis.
"Molecular weight and molecular weight distribution", Polymer Properties Database, URL: https://polymerdatabase.com/polymer%20physics/Molecular%20Weight.html.

(Continued)

*Primary Examiner* — Alicia Chevalier
(74) *Attorney, Agent, or Firm* — Kile Park Reed & Houtteman PLLC

(57) ABSTRACT

Disclosed is an acrylic adhesive, including an acrylic polymer obtained by polymerizing a mixture of about 120 parts by weight to about 250 parts by weight of acrylic monomers with about 0.1 parts by weight to about 1 parts by weight of an azo initiator, about 0.5 parts by weight to about 1 parts by weight of a filler, about 1.5 parts by weight to about 2.5 parts by weight of a crosslinking agent, and about 0.5 parts by weight to 1 parts by weight of an anti-static agent.

20 Claims, 8 Drawing Sheets

(56) References Cited

FOREIGN PATENT DOCUMENTS

| | | | | |
|---|---|---|---|---|
| JP | 07109446 | A | * | 4/1995 |
| JP | 2008050507 | A | * | 3/2008 |
| JP | 2011-236269 | | | 11/2011 |
| KR | 10-0892865 | B1 | | 4/2009 |
| KR | 10-1456063 | B1 | | 11/2014 |

OTHER PUBLICATIONS

European Office Action corresponding to European Patent Application No. 17181867.7 dated Dec. 5, 2019.
Chinese Office Action for Chinese Patent Application No. 201710599814.5, dated Jul. 23, 2020.

* cited by examiner

ACRYLIC ADHESIVE AND PROTECTIVE FILM INCLUDING THE SAME

CROSS-REFERENCE TO RELATED APPLICATION

Korean Patent Application No. 10-2016-0093124, filed on Jul. 22, 2016, in the Korean Intellectual Property Office, and entitled: "Acrylic Adhesive and Protective Film Including the Same," is incorporated by reference herein in its entirety.

BACKGROUND

1. Field

Embodiments relate to an acrylic adhesive, and a protective film including the same.

2. Description of the Related Art

Products, such as a display, may adopt a protective film for protecting surface contamination and the like during a manufacturing process.

SUMMARY

Embodiments are directed to an acrylic adhesive, including an acrylic polymer obtained by polymerizing a mixture of about 120 parts by weight to about 250 parts by weight of acrylic monomers with about 0.1 parts by weight to about 1 parts by weight of an azo initiator, about 0.5 parts by weight to about 1 parts by weight of a filler, about 1.5 parts by weight to about 2.5 parts by weight of a crosslinking agent, and about 0.5 parts by weight to about 1 parts by weight of an anti-static agent.

The acrylic monomers may include 2-ethylhexylacrylate and 2-(2-ethoxyethoxy)ethyl acrylate.

The acrylic monomers may include about 100 parts by weight of the 2-ethylhexylacrylate and about 5 parts by weight to about 45 parts by weight of the 2-(2-ethoxyethoxy)ethyl acrylate.

The acrylic monomers may further include butylacrylate.

The acrylic monomers may include about 10 parts by weight to about 60 parts by weight of the butylacrylate.

The acrylic monomers may further include hydroxyethylacrylate.

The acrylic monomers may include about 4 parts by weight to about 45 parts by weight of the hydroxyethylacrylate.

Weight average molecular weight of the acrylic polymer may be about 450,000 to about 900,000. Weight average molecular weight of the acrylic polymer may be about 450,000 to about 800,000.

The azo initiator may be 2,2'-azobisisobutyronitrile.

The filler may be formed of silica of which a particle size is about 0.1 to about 1 micrometer.

The crosslinking agent may include isocyanate.

Embodiments are also directed to a protective film that includes a support film and an acrylic adhesive layer formed using an acrylic adhesive composition according to an embodiment. The adhesive layer may include an acrylic polymer obtained by polymerizing about 120 parts by weight to about 250 parts by weight of acrylic monomers, about 0.1 parts by weight to about 1 parts by weight of an azo initiator, about 0.5 parts by weight to about 1 parts by weight of a filler, about 1.5 parts by weight to about 2.5 parts by weight of a crosslinking agent, and about 0.5 parts by weight to about 1 parts by weight of an anti-static agent.

Embodiments are also directed to a display device, including: a display panel; and a protective film formed on the display panel.

BRIEF DESCRIPTION OF THE DRAWINGS

Features will become apparent to those of skill in the art by describing in detail example embodiments with reference to the attached drawings in which.

DETAILED DESCRIPTION

Figure 1:
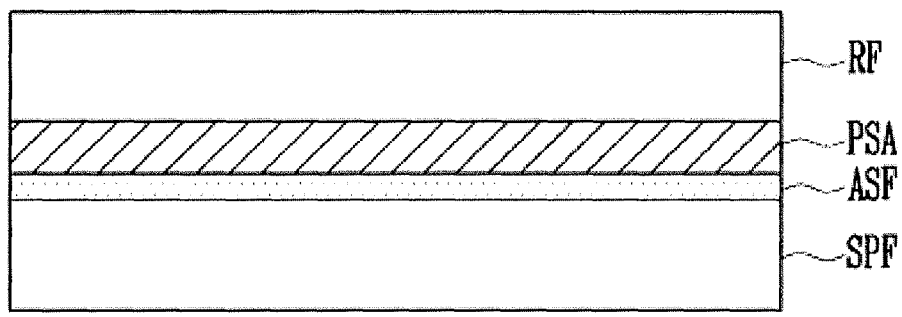
FIG. 1 illustrates a cross-sectional view illustrating a protective film according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

Terms "first", "second", and the like may be used for describing various constituent elements, but the constituent elements should not be limited to the terms. The terms are used only to discriminate one constituent element from another constituent element. For example, a first element could be termed a second element, and similarly, a second element could be also termed a first element without departing from the scope of the present disclosure. As used herein, the singular forms are intended to include the plural forms as well, unless the context clearly indicates otherwise.

In the present invention, it should be understood that terms "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance. It will be understood that when an element such as a layer, film, region, or substrate is referred to as being "on" another element, it can be directly on the other element or intervening elements may also be present. Further, in the present invention, when a part of a layer, a film, an area, a plate, and the like is formed on another part, a direction, in which the part is formed, is not limited only to an up direction, and includes a lateral direction or a down direction. On the contrary, it will be understood that when an element such as a layer, film, region, or substrate is referred to as being "beneath" another element, it can be directly beneath the other element or intervening elements may also be present.

Hereinafter, an example embodiment will be described in detail in more detail with reference to the accompanying drawings.

Embodiments relate to an acrylic adhesive, and the acrylic adhesive is provided to a protective film protecting a surface of a display device and is usable for attaching the protective film to the display device. Further, the acrylic adhesive may be used as an adhesive bonding constituent elements among other adjacent constituent elements of the display device. This will be described below.

An adhesive according to an example embodiment includes an acrylic polymer polymerized of acrylic monomers, and an azo initiator, a filler, a crosslinking agent, and an anti-static agent.

The acrylic adhesive according to the present example embodiment may include about 120 parts by weight to about 250 parts by weight of the acrylic polymer, about 0.1 parts by weight to about 1 parts by weight of the azo initiator, about 0.5 parts by weight to about 1 parts by weight of the filler, about 1.5 parts by weight to about 2.5 parts by weight of the crosslinking agent, and about 0.5 parts by weight to about 1 parts by weight of the anti-static agent.

In the acrylic polymer, the acrylic monomers are polymerized, and the acrylic monomers are an ingredient serving as a main material of an acrylic adhesive composition for a protective film according to the present example embodiment.

The acrylic adhesive having the aforementioned composition may be prepared by mixing about 120 parts by weight to about 250 parts by weight of the acrylic monomers and a solvent and heating the mixture while stirring the mixture, and adding about 0.1 parts by weight to about 1 parts by weight of the azo initiator, about 0.5 parts by weight to about 1 parts by weight of the filler, about 1.5 parts by weight to about 2.5 parts by weight of the crosslinking agent, and about 0.5 parts by weight to about 1 parts by weight of the anti-static agent to the solution and heating the mixture while stirring the mixture.

According to an example embodiment, the solvent is contained by about 100 parts by weight to about 250 parts by weight, and is composed of ethyl acetate. Ethyl acetate may exhibit excellent efficiency in consideration of a transfer rate and molecular weight in a polymerization of the acrylic monomers. In general, methyl ethyl ketone, toluene, acetone, and benzene which are solvents used in the polymerization of acrylic monomers have a high radical transfer coefficient, which may make it difficult to prepare an acrylic adhesive having high molecular weight, and methyl ethyl ketone, toluene, acetone, and benzene are generally used for preparing an acrylic adhesive of which weight-average molecular weight is about 20,000 or less.

The acrylic monomers according to the present example embodiment may be formed into a polymer, in which acrylic monomers are polymerized, and may include, for example, ethylacrylate, n-butylacrylate, t-butylacrylate, isobutylacrylate, n-hexylacrylate, 2-ethyl hexylacrylate, n-octylacrylate, isooctylacrylate, n-nonylacrylate, iso nonylacrylate, n-decylacrylate, iso decylacrylate, n-dodecylacrylate, n-tridecylacrylate, n-tetradecylacrylate, 2(2-ethoxy ethoxy) ethylacrylate, 2-hydroxy ethylacrylate, 2-hydroxy propylacrylate, 3-hydroxy propylacrylate, 2-hydroxy butylacrylate, 4-hydroxy butylacrylate, 6-hydroxy hexylacrylate, 8-hydroxy octylacrylate, 10-hydroxy decylacrylate, 12-hydroxy laurylacrylate, [4-(hydroxymethyl)cyclohexyl]methylacrylate, and the like.

In the present example embodiment, the acrylic adhesive may include the 2-ethyl hexylacrylate, butylacrylate, 2-hydroxy ethylacrylate, and 2(2-ethoxy ethoxy)ethylacrylate.

The 2-ethyl hexylacrylate may be a main ingredient composing the acrylic monomers, and may help provide a desirable low glass transfer temperature for an acrylic adhesive.

In the present example embodiment, the butylacrylate is contained by about 10 parts by weight to about 60 parts by weight, and may help to adjust copolymerization reactive ratios of the 2-ethyl hexylacrylate that is a base monomer and the 2-hydroxy ethylacrylate that is a polar monomer to be similar, which may thereby increase randomness on a polymer chain. In general, ethylacrylate or methylacrylate has relatively high hardness, so that ethylacrylate or methylacrylate is hard, and ethylacrylate or methylacrylate may have a relatively low effect of improving adhesive force. Because of this, butylacrylate may be used for maintaining adhesive force of the acrylic adhesive as described above, improving surface roughness of the acrylic adhesive, and maintaining a balance between low-speed peeling force and high-speed peeling force.

When a content of butylacrylate is less than 10 parts by weight, the aforementioned effect may be relatively low, and when a content of butylacrylate is more than 60 parts by weight, contents of 2-ethyl hexylacrylate and 2-hydroxy ethylacrylate may be relatively decreased, so that it may be more difficult to provide the acrylic adhesive exhibiting a property appropriate to a protective film and having a low aging variation.

According to the present example embodiment, the 2-hydroxyl ethylacrylate is contained by about 5 parts by weight to about 45 parts by weight and exhibits polarity. Thus, the 2-hydroxyl ethylacrylate may help to enable the acrylic adhesive to exhibit adhesive force to an adherend and form a crosslinking reaction site with an isocyanate hardening agent. When acrylic acid that is an acid type is reacted with an epoxy hardening agent or an aziridine hardening agent, instead of the 2-hydroxyl ethylacrylate exhibiting polarity as described above, polarity may be very strong, so that adhesive force to Steel Use Stainless (SUS) or a glass surface is improved, and there is an increased possibility in corroding a material of an electronic product.

Hydroxyl ethyl methacrylate that is an acid-free type (acrylate, in which —OH is a functional group) is far cheaper than the 2-hydroxy ethylacrylate, but may exhibit an incomplete crosslinking density in an aspect of a quality.

The 2-(2-ethoxyethoxy)ethyl acrylate is contained by 5 parts by weight to 45 parts by weight, and may contribute excellent wettability to an adherend by a long chain structure, and may help to provide the acrylic adhesive having a low contraction rate.

The azo initiator generates free radical initiating polymerization or copolymerization of the acrylic monomers. The azo initiator is a heat initiator, and initiates polymerization or copolymerization of the acrylic monomers when the acrylic monomers solution is heated.

In the present example embodiment, the azo initiator may be contained by 0.1 parts by weight to 1 parts by weight. The azo initiator may stably and representatively polymerize acrylic monomers compared to an initiator such as benzoyl peroxide, and may provide the acrylic adhesive having a low aging variation.

When a content of azo initiator is less than 0.1 parts by weight, the aforementioned effect may be relatively low, and when a content of azo initiator is more than 1 parts by weight, an effect of decreasing an aging rate may be relatively low and preparing costs may be increased.

In the present example embodiment, the azo initiator may be 2,2'-azobisisobutyloniltrile.

The filler may be selected from an organic filler or an inorganic filler. The inorganic filler may include silica, zirconia, or other various kinds of microparticles. The organic and/or inorganic filler may be a porous material having a nanometer size to a micrometer size.

In the present example embodiment, the filler may be contained in about 0.5 parts by weight to about 1 parts by weight. The filler may be formed of silica of which a particle size is 0.1 to 1 micrometer. A porous internal space of the silica, which has a particle size of 0.1 to 1 micrometer and is porous, may be filled with an acrylic ingredient exhibiting adhesive force. Accordingly, cohesiveness between the acrylic ingredients may be improved, so that a phenomenon, in which the acrylic adhesive ingredient is transferred to an adherend, is decreased. Further, there may be an effect in that an uneven portion is formed on a surface of the acrylic adhesive, thereby suppressing adhesive force of the acrylic adhesive from being improved and, thus, the filler may block various organic materials, for example, a migrating organic material, such as a plasticizer, and moisture, which may be introduced from the outside, thereby suppressing an adherend from being contaminated.

When a content of filler is less than 0.5 parts by weight, the aforementioned effect may be relatively low, and when a content of filler is more than 1 parts by weight, the aforementioned effect may not be improved much and adhesive force of the acrylic adhesive may be degraded.

Further, when a particle size of the filler is less than 0.1 micrometer, the aforementioned effect may be relatively low, and when a particle size of the filler is more than 1 micrometer, adhesive force of the acrylic adhesive may be degraded.

The crosslinking agent may be prepared through a reaction with a monomer including a hydroxyl group among the acrylic monomers. In the present example embodiment, the crosslinking agent may be contained by about 1.5 parts by weight to about 2.5 parts by weight.

In the present example embodiment, the crosslinking agent may be an aziridine or isocyanate crosslinking agent. The crosslinking agent may be a crosslinking agent that reacts with a hydroxyl group (—OH). For example, the crosslinking agent may be any one of 1,1'-isophthaloyl-bis (2-methyl aziridine), trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, 2,4,4-trimethyl hexamethylene diisocyanate, 1,3-cyclopentane diisocyanate, 1,3-cyclohexane diisocyanate, 1,4-cyclohexane diisocyanate, isophorone diisocyanate, hydrogen added diphenyl methane diisocyanate, hydrogen added xylylene diisocyanate, hydrogen added tolylene diisocyanate, hydrogen added tetramethyl xylylene diisocyanate, phenylene diisocyanate, 2,4-tolylene diisocyanate, 2,2'-diphenyl methane diisocyanate, 4,4'-diphenyl methane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate.

In the present example embodiment, the crosslinking agent may be hexamethylene diisocyanate.

When a content of crosslinking agent is less than 1.5 parts by weight, an effect of improving the degree of crosslinking by the crosslinking agent may be relatively low, and when a content of crosslinking agent is more than 2.5 parts by weight, the degree of crosslinking may be sharply increased, so that initial adhesive force tends to be degraded, and a behavior of the acrylic adhesive is similar to that of a general acrylic adhesive, but after the acrylic adhesive is exposed to a high temperature, adhesive force is rather increased.

A phenomenon, in which adhesive force of the acrylic adhesive is increased after the acrylic adhesive is exposed to a high temperature, may be generated by a progress of a side reaction due to the remainder of the crosslinking agent during a process in which the crosslinking agent exceeding 2.5 parts by weight is used. When adhesive force of the acrylic adhesive is improved by the aforementioned phenomenon, the acrylic adhesive ingredient may be transferred to an adherend.

Accordingly, when a content of crosslinking agent is large, the degree of crosslinking is increased, but in consideration of an aging variation, a content of crosslinking agent may be about 1.5 parts by weight to about 2.5 parts by weight.

The anti-static agent may help prevent static electricity by reducing a surface electric resistance value of the acrylic adhesive.

In the present example embodiment, the anti-static agent may be contained by about 0.5 parts by weight to about 1 parts by weight, and may be formed of a conductive organic material, for example, ethylenedioxythiophene:polystyrene sulfonate (PEDOT:PSS).

In general, when surface electric resistance of the acrylic adhesive is large, static electricity generated by friction is less likely to be discharged to the outside, so that contaminants by static electricity may be attached onto a surface of the acrylic adhesive and thus contamination may be increased. However, when the anti-static agent is included in the acrylic adhesive as described above, surface electric resistance of the acrylic adhesive may be decreased and static electricity may be easily discharged to the outside, thereby suppressing contamination by static electricity.

When a content of anti-static agent is less than 0.5 parts by weight, the aforementioned effect may be relatively low, and when a content of anti-static agent is more than 1 parts by weight, the aforementioned effect may not be improved much more, and a property of the acrylic adhesive may be degraded and preparing costs may be increased.

The acrylic adhesive formed of the aforementioned ingredients may be prepared by a process of preparing a general acrylic adhesive. In the acrylic adhesive, a polymerization process may be preformed so that weight average molecular weight of an acrylic polymer is about 450,000 to about 900,000. When molecular weight of the acrylic adhesive composition is increased, an aging variation may be decreased (because polymer chains are connected with each other while the molecular weight is increased), but in consideration of polymerization stability and coating performance of the acrylic adhesive, the polymerization process may be preformed so that weight average molecular weight of an acrylic polymer is about 450,000 to about 900,000.

The acrylic adhesive may be used in various devices as an acrylic adhesive. In the present example embodiment, the acrylic adhesive may be used in a protective film for a display device.

FIG. 1 is a cross-sectional view illustrating a protective film according to an example embodiment.

Referring to FIG. 1, the protective film according to the present example embodiment may include a support film SPF, an adhesive layer PSA provided on the support film SPF, and a release film RF provided on the adhesive layer PSA.

If the support film SPF protects an adherend, the support film SPF is sufficient, and is not particularly limited. The support film SPF may be formed of various materials, for example, a metal sheet, an organic polymer sheet, and a rubber sheet.

The support film SPF according to the present example embodiment may be formed of an organic polymer. The organic polymer may include at least one of polyethylene, polypropylene, an ethylene-propylene copolymer, an ethylene-vinyl acetate copolymer, an olefin base polymer, polyethylene terephthalate, polyethylene naphthalate, polybutylene terephthalate, polycarbonate, polyvinyl chloride, a vinyl acetate base polymer, polyphenylene sulfide, polyamide (nylon), polyamide, polyimide, polyetheretherketone, and polyether.

According to the present example embodiment, the acrylic adhesive layer is provided on at least one surface of the support film SPF. The acrylic adhesive layer is formed of the aforementioned acrylic adhesive, and may cover one surface of the support film SPF.

According to the present example embodiment, the acrylic adhesive includes the acrylic adhesive layer PSA formed of an acrylic polymer obtained by polymerizing about 120 parts by weight to about 250 parts by weight of acrylic monomers with about 0.1 parts by weight to about 1 parts by weight of an azo initiator, about 0.5 parts by weight to about 1 parts by weight of a porous inorganic material, about 1.5 parts by weight to about 2.5 parts by weight of a crosslinking agent, and about 0.5 parts by weight to about 1 parts by weight of an anti-static agent.

According to the present example embodiment, the release film RF is provided on the acrylic adhesive. The release film RF faces the support film SPF with the acrylic adhesive interposed therebetween. Accordingly, one surface of the acrylic adhesive layer is in contact with the support film SPF, and the other surface is in contact with the release film RF.

The release film RF may be formed of an organic polymer. The organic polymer may include at least one of polyethylene, polypropylene, an ethylene-propylene copolymer, an ethylene-vinyl acetate copolymer, an olefin base polymer, polyethylene terephthalate, polyethylene naphthalate, polybutylene terephthalate, polycarbonate, polyvinyl chloride, a vinyl acetate base polymer, polyphenylene sulfide, polyamide (nylon), polyamide, polyimide, polyetheretherketone, and polyether. In the present example embodiment, the release film RF may be formed of the same material as that of the support film SPF, but the release film RF and the support film SPF may also be formed of different materials.

In the present example embodiment, the protective film may further include an anti-static layer ASF between the support film SPF and the acrylic adhesive. The anti-static layer ASF may be formed of a conductive material, and a material thereof is not particularly limited. The anti-static layer ASF may help prevent the protective film from being charged.

According to the present example embodiment, the protective film is bonded to one surface of an adherend to protect the adherend. The release film RF in the protective film is removed when being bonded to the adherend. Thus, one surface of the acrylic adhesive layer is exposed by removing the release film RF, and the protective film is provided on the adherend by attaching the exposed acrylic adhesive layer to the adherend which is desired to be protected.

The protective film finishing the role of protecting the adherend may be removed by peeling off the adhesive layer PSA and the support film SPF attached to the adherend again.

The protective film may be used for protecting a display panel DSP.

Figure 2:
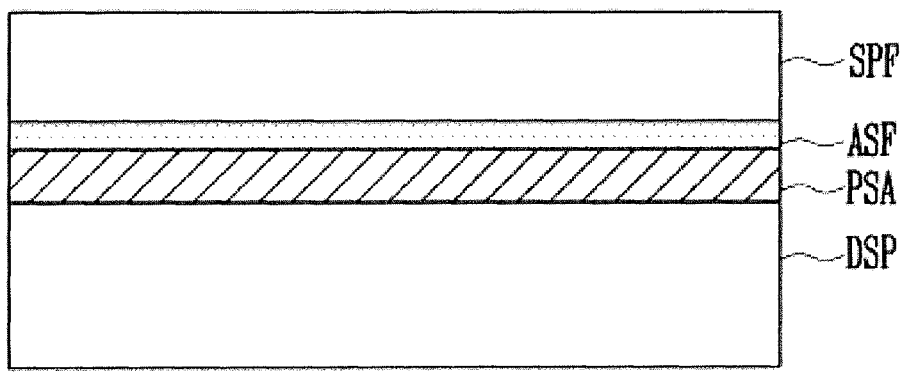
FIG. 2 illustrates a cross-sectional view illustrating a display device according to an example embodiment.

FIG. 2 is a cross-sectional view illustrating a display device according to an example embodiment, and illustrates the display device adopting the protective film according to the present example embodiment.

Referring to FIG. 2, the display device according to the present example embodiment may include the display panel DSP, and the protective film provided on the display panel DSP.

The display panel DSP may include a plurality of pixels and provide a user with images. The display panel DSP may display an image. For example, the display panel DSP may be an organic light emitting display panel, a liquid crystal panel, an electrophoretic display panel, an electrowetting display panel, a Micro Electro-Mechanical system (MEMS) display panel, etc.

The protective film protects the display panel during a process of fabricating the display panel and/or until the display panel is fabricated and then the fabricated display panel is transferred to a user, and the display panel may be a complete product or a product in an intermediate stage for manufacturing a complete product.

The protective film includes a support film SPF and an adhesive layer PSA. The adhesive layer PSA is provided between the support film SPF and one surface of the display panel DSP. The support film SPF is attached to the display panel by the adhesive layer PSA, and protects one surface of the display panel DSP from the outside.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Hereinafter, a method of preparing an acrylic adhesive for a surface protective film for a display device according to the present example embodiment will be described based on embodiments. For convenience of the description, in the embodiments below, used weight of constituent elements forming the acrylic adhesive is represented with a weight ratio with another constituent element.

Embodiment 1

A mixture of acrylic monomers was prepared by inserting 100 parts by weight of 2-ethylhexylacrylate, 35 parts by weight of butylacrylate, 25 parts by weight of 2-hydroxyethylacrylate, 25 parts by weight of 2-(2-ethoxyethoxy)ethyl acrylate, and 200 parts by weight of ethylacetate into a reactor provided with a heating device, and stirring the mixture at a speed of 500 rpm for 10 minutes in a state where the mixture is heated to 80° C.

An acrylic adhesive was prepared by mixing the mixture and 0.7 parts by weight of porous silica, of which an average particle size is 0.5 micrometer, 0.13 parts by weight of 2,2'-azobisisobutyronitrile, and 0.5 parts by weight of PEDOT:PSS, and stirring the mixture at a temperature of 70° C. at a speed of 200 rpm for 8 hours.

Embodiment 2

Embodiment 2 was identically performed to Embodiment 1, except that an adhesive was prepared by mixing 0.4 parts by weight of 2,2'-azobisisobutyronitrile.

Embodiment 3

Embodiment 3 was identically performed to Embodiment 1, except that an adhesive was prepared by mixing 0.6 parts by weight of 2,2'-azobisisobutyronitrile.

Embodiment 4

Embodiment 4 was identically performed to Embodiment 1, except that an adhesive was prepared by mixing 0.8 parts by weight of 2,2'-azobisisobutyronitrile.

Embodiment 5

A mixture of acrylic monomers was prepared by inserting 100 parts by weight of 2-ethylhexylacrylate, 35 parts by weight of butylacrylate, 25 parts by weight of 2-hydroxyethylacrylate, and 200 parts by weight of ethylacetate into a reactor provided with a heating device, and stirring the mixture at a speed of 500 rpm for 10 minutes in a state where the mixture is heated to 80° C. Next, an acrylic adhesive was prepared by mixing the mixture and 0.7 parts by weight of porous silica, of which an average particle size is 0.5 micrometer, 0.13 parts by weight of 2,2'-azobisisobutyronitrile, and 1.5 parts by weight of hexamethylene diisocyanate, and stirring the mixture at a temperature of 70° C. at a speed of 200 rpm for 8 hours.

Embodiment 6

Embodiment 6 was identically performed to Embodiment 5, except that an adhesive was prepared by mixing 2.0 parts by weight of hexamethylene diisocyanate.

Embodiment 7

Embodiment 7 was identically performed to Embodiment 5, except that an adhesive was prepared by mixing 2.5 parts by weight of hexamethylene diisocyanate.

Embodiment 8

Embodiment 8 was identically performed to Embodiment 5, except that an adhesive was prepared by mixing 3.0 parts by weight of hexamethylene diisocyanate.

Embodiment 9

Embodiment 9 was identically performed to Embodiment 5, except that an adhesive was prepared by mixing 3.5 parts by weight of hexamethylene diisocyanate.

Embodiment 10

Embodiment 10 was identically performed to Embodiment 7, except that an adhesive was prepared by polymerization so that weight average molecular weight was 557,000.

Embodiment 11

Embodiment 11 was identically performed to Embodiment 7, except that an adhesive was prepared by polymerization so that weight average molecular weight was 622,000.

Embodiment 12

Embodiment 12 was identically performed to Embodiment 7, except that an adhesive was prepared by polymerization so that weight average molecular weight was 794,000.

Embodiment 13

Embodiment 13 was identically performed to Embodiment 7, except that an adhesive was prepared by polymerization so that weight average molecular weight was 852,000.

Embodiment 14

Embodiment 14 was identically performed to Embodiment 1, except that an adhesive was prepared by mixing 0.7 parts by weight of PEDOT:PSS.

Embodiment 15

Embodiment 15 was identically performed to Embodiment 1, except that an adhesive was prepared by mixing 1 parts by weight of PEDOT:PSS.

Comparative Example 1

Comparative Example 1 was identically performed to Embodiment 1, except that an adhesive was prepared by mixing 0.13 parts by weight of benzoyl peroxide, instead of 2,2'-azobisisobutyronitrile, without mixing porous silica.

Comparative Example 2

Comparative Example 2 was identically performed to Embodiment 1, except that an adhesive was prepared by mixing 0.4 parts by weight of benzoyl peroxide, instead of 2,2'-azobisisobutyronitrile, without mixing porous silica.

Comparative Example 3

Comparative Example 3 was identically performed to Embodiment 1, except that an adhesive was prepared by mixing 0.6 parts by weight of benzoyl peroxide, instead of 2,2'-azobisisobutyronitrile, without mixing porous silica.

Comparative Example 4

Comparative Example 4 was identically performed to Embodiment 1, except that an adhesive was prepared by mixing 0.8 parts by weight of benzoyl peroxide, instead of 2,2'-azobisisobutyronitrile, without mixing porous silica.

Comparative Example 5

Comparative Example 5 was identically performed to Embodiment 1, except that an adhesive was prepared without mixing porous silica.

Comparative Example 6

Comparative Example 6 was identically performed to Embodiment 2, except that an adhesive was prepared without mixing porous silica.

Comparative Example 7

Comparative Example 7 was identically performed to Embodiment 3, except that an adhesive was prepared without mixing porous silica.

Comparative Example 8

Comparative Example 8 was identically performed to Embodiment 4, except that an adhesive was prepared without mixing porous silica.

Comparative Example 9

Comparative Example 9 was identically performed to Embodiment 1, except that an adhesive was prepared by mixing 0.8 parts by weight of benzoyl peroxide, instead of 2,2'-azobisisobutyronitrile.

Comparative Example 10

Comparative Example 10 was identically performed to Embodiment 2, except that an adhesive was prepared by mixing 0.8 parts by weight of benzoyl peroxide, instead of 2,2'-azobisisobutyronitrile.

Comparative Example 11

Comparative Example 11 was identically performed to Embodiment 3, except that an adhesive was prepared by mixing 0.8 parts by weight of benzoyl peroxide, instead of 2,2'-azobisisobutyronitrile.

Comparative Example 12

Comparative Example 12 was identically performed to Embodiment 4, except that an adhesive was prepared by mixing 0.8 parts by weight of benzoyl peroxide, instead of 2,2'-azobisisobutyronitrile.

Comparative Example 13

Comparative Example 13 was identically performed to Embodiment 5, except that an adhesive was prepared by mixing 1.5 parts by weight of hexamethylene diisocyanate without mixing porous silica.

Comparative Example 14

Comparative Example 14 was identically performed to Embodiment 5, except that an adhesive was prepared by mixing 2.0 parts by weight of hexamethylene diisocyanate without mixing porous silica.

Comparative Example 15

Comparative Example 15 was identically performed to Embodiment 5, except that an adhesive was prepared by mixing 2.5 parts by weight of hexamethylene diisocyanate without mixing porous silica.

Comparative Example 16 was identically performed to Embodiment 5, except that an adhesive was prepared by mixing 3.0 parts by weight of hexamethylene diisocyanate without mixing porous silica.

Comparative Example 17

Comparative Example 17 was identically performed to Embodiment 5, except that an adhesive was prepared by mixing 3.5 parts by weight of hexamethylene diisocyanate without mixing porous silica.

Comparative Example 18

Comparative Example 18 was identically performed to Embodiment 5, except that an adhesive was prepared by polymerization so that weight average molecular weight was 384,000.

Comparative Example 19

Comparative Example 19 was identically performed to Embodiment 7, except that an adhesive was prepared by polymerization so that weight average molecular weight was 436,000.

Evaluation of Embodiments and Comparative Examples

Table 1 below represents results of the measurement of the properties of the acrylic adhesives prepared through Embodiments 1 to 4, and Comparative Examples 1 to 12. In Table 1, TSC means a total solid content, Mw means molecular weight, and Residue means a residue left on a surface of an adherend when the protective film is removed from the adherend.

Here, adhesive force was measured by using KS M 3725 that is a peeling strength measuring method, viscosity of the adhesive layer was 500 cp, and a thickness of the adhesive layer was 20 micrometers. In Table 1 below, AIBN is 2,2'-azobisisobutyronitrile, and BPO is benzoyl peroxide. In adhesive force, a result value indicated with "initial" means an initial adhesive force value, and a result value indicated with "85° C. RH85% 3 day" means an adhesive force value under a high temperature condition, and means an adhesive force value after the acrylic adhesive is maintained at 85° C. for three days under the condition of relative humidity of 85%.

Figure 3:
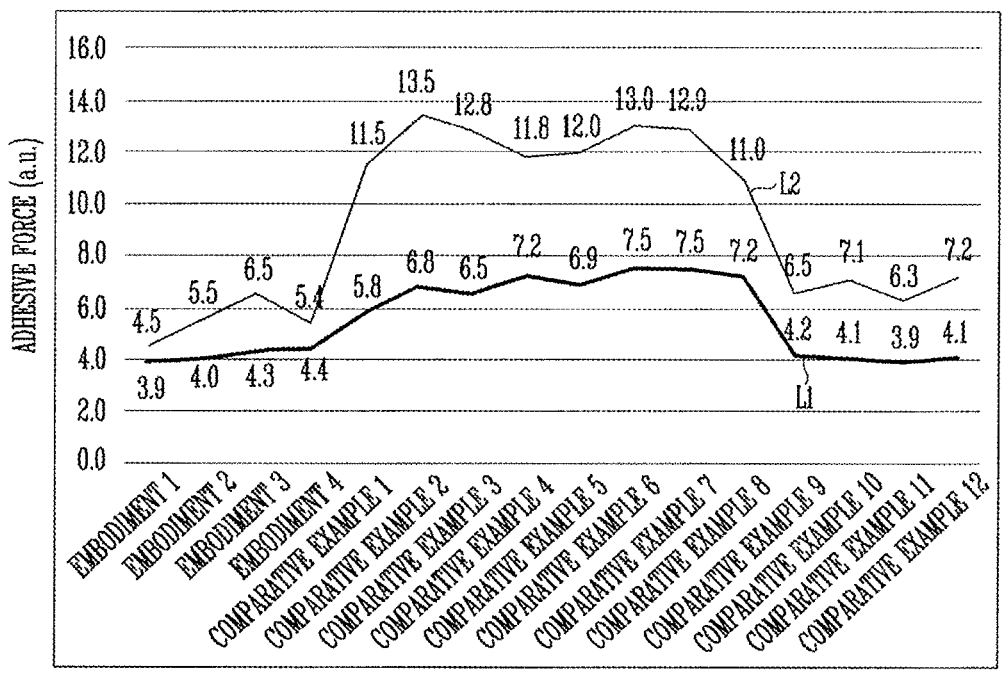
FIG. 3 illustrates a result of Table 1, and is a graph representing initial adhesive force and adhesive force under a high temperature condition of Embodiments 1 to 4, and Comparative Examples 1 to 12.

FIG. 3 is a graph illustrating a result of Table 1, and is a graph representing initial adhesive force and adhesive force under a high temperature condition of Embodiments 1 to 4, and Comparative Examples 1 to 12.

TABLE 1

| Classification | Initiator AIBN | Initiator BPO | TSC (%) | Mw (ten thousand) | Viscosity (cp) | Adhesive force (gf/in) 85° C. RH-85% Initial | Adhesive force (gf/in) 85° C. RH-85% 3 day | Residue |
|---|---|---|---|---|---|---|---|---|
| Embodiment 1 | 0.13 | | 36.5 | 60.0 | 1850 | 3.9 | 4.5 | Clear |
| Embodiment 2 | 0.4 | | 36.6 | 61.3 | 1980 | 4.0 | 5.5 | Clear |
| Embodiment 3 | 0.6 | | 36.7 | 59.8 | 1880 | 4.3 | 6.5 | Clear |
| Embodiment 4 | 0.8 | | 36.6 | 58.6 | 1860 | 4.4 | 5.4 | Clear |
| Comparative Example 1 | | 0.13 | 35.7 | 62.2 | 2110 | 5.8 | 11.5 | Clear |
| Comparative Example 2 | | 0.4 | 35.8 | 63.4 | 2120 | 6.8 | 13.5 | Clear |
| Comparative Example 3 | | 0.6 | 35.9 | 61.3 | 2080 | 6.5 | 12.8 | Clear |
| Comparative Example 4 | | 0.8 | 35.9 | 59.4 | 2020 | 7.2 | 11.8 | Clear |
| Comparative Example 5 | 0.13 | | 36.4 | 60.5 | 1920 | 6.9 | 12.0 | Clear |
| Comparative Example 6 | 0.4 | | 35.9 | 60.2 | 1900 | 7.5 | 13.1 | Clear |
| Comparative Example 7 | 0.6 | | 36.5 | 59.9 | 1860 | 7.5 | 12.9 | Clear |
| Comparative Example 8 | 0.8 | | 36.4 | 59.7 | 1850 | 7.2 | 11.0 | Clear |
| Comparative Example 9 | | 0.13 | 35.4 | 62.9 | 2100 | 4.2 | 6.5 | Clear |
| Comparative Example 10 | | 0.4 | 35.8 | 62.8 | 2080 | 4.1 | 7.1 | Clear |
| Comparative Example 11 | | 0.6 | 35.2 | 62.5 | 1990 | 3.9 | 6.3 | Clear |
| Comparative Example 12 | | 0.8 | 35.6 | 61.8 | 1950 | 4.1 | 7.2 | Clear |

Referring to Table. 1 and FIG. 3, in cases of Embodiments 1 to 4, in which silica was used while using AIBN as the initiator, a change in adhesive force is little compared to cases of Comparative Examples 1 to 12, in which BPO was used as an initiator, or silica was not used. Thus, an aging variation is low in Embodiments 1 to 4 using silica while using AIBN as the initiator.

When Embodiments 1 to 4 and Comparative Examples 5 to 8, which used AIBN as the initiator are compared with Comparative Examples 1 to 4, and Comparative Examples 9 to 12 using BPO as the initiator, it can be seen that the aging variation in the case where AIBN is used as the initiator is lower than that of the case where BPO is used as the initiator. Thus, when AIBN is used as the initiator, a difference between the initial adhesive force and the adhesive force under the high temperature condition is not large.

Further, when Embodiments 1 to 4 and Comparative Examples 9 to 12, which include silica as the filler are compared with Comparative Examples 1 to 8 which do not include silica, it can be seen that the aging variation in the case where silica is included is lower than that of the case where silica is not included. Thus, when silica is included, a difference between the initial adhesive force and the adhesive force under the high temperature condition is not large. Particularly, in Comparative Examples 1 to 8, which do not include silica, adhesive force under the high temperature condition is remarkably increased than the initial adhesive force, so that when adhesive force of the acrylic adhesive is excessively increased, a possibility that the residue is generated in an environment, such as the exposure to a high temperature for a long time, is increased.

Table 2 below represents results of the measurement of the acrylic adhesives prepared through Embodiments 5 to 9, and Comparative Examples 13 to 17.

Figure 4:
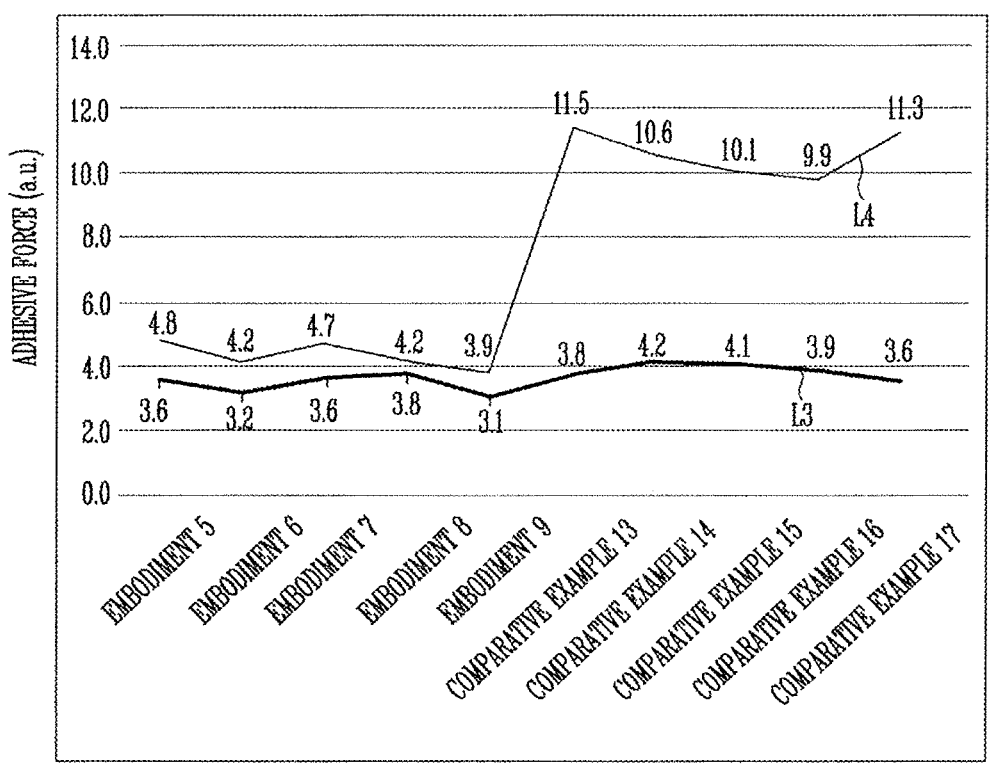
FIG. 4 illustrates a result of Table 2, and is a graph representing initial adhesive force and adhesive force under a high temperature condition of Embodiments 5 to 9, and Comparative Examples 13 to 17.

FIG. 4 illustrates a result of Table 2, and is a graph representing initial adhesive force and adhesive force under a high temperature condition of Embodiments 5 to 9, and Comparative Examples 13 to 17.

Here, adhesive force was measured by using KS M 3725 that is a peeling strength measuring method, viscosity of the adhesive layer was 500 cp, a thickness of the adhesive layer was 20 micrometers, and TSC was 27.5%. In Table 2 below, a result value indicated with "initial" means an initial adhesive force value, and a result value indicated with "85° C. RH85% 3 day" means an adhesive force value under a high temperature condition, and means an adhesive force value after the acrylic adhesive is maintained at 85° C. for three days under the condition of relative humidity of 85%. Further, Residue means a residue left on a surface of an adherend when the protective film is removed from the adherend. Although not illustrated in Table 2, when hexamethylene diisocyanate is used as the crosslinking agent, the degree of crosslinking is a value equal to or larger than 75%.

TABLE 2

| Classification | Hexamethylene diisocyanate | Degree of crosslinking (%) | Adhesive force Initial stage | Adhesive force 85° C. RH85% 3 day | Residue |
|---|---|---|---|---|---|
| Embodiment 5 | 1.5 | 79.1 | 3.6 | 4.8 | Clear |
| Embodiment 6 | 2.0 | 82.5 | 3.2 | 4.2 | Clear |
| Embodiment 7 | 2.5 | 85.4 | 3.6 | 4.7 | Clear |
| Embodiment 8 | 3.0 | 88.2 | 3.8 | 4.2 | Clear |
| Embodiment 9 | 3.5 | 88.5 | 3.1 | 3.9 | Clear |
| Comparative Example 13 | 1.5 | 78.8 | 3.8 | 11.5 | Clear |

TABLE 2-continued

| | | Adhesive force | | | |
|---|---|---|---|---|---|
| Classification | Hexamethylene diisocyanate | Degree of crosslinking (%) | Initial stage | 85° C. RH85% 3 day | Residue |
| Comparative Example 14 | 2.0 | 82.4 | 4.2 | 10.6 | Clear |
| Comparative Example 15 | 2.5 | 84.3 | 4.1 | 10.1 | Clear |
| Comparative Example 16 | 3.0 | 87.9 | 3.9 | 9.9 | NG |
| Comparative Example 17 | 3.5 | 88.3 | 3.6 | 11.3 | NG |

Referring to Table 2 and FIG. 4, the acrylic adhesive including hexamethylene diisocyanate as the crosslinking agent exhibits good initial adhesive force and adhesive force under the high temperature condition when containing 1.5 parts by weight to 3.5 parts by weight of hexamethylene diisocyanate.

In addition, when Embodiments 5 to 9 including silica as the filler are compared with Comparative Examples 13 to 17 which do not include silica, it can be seen that the aging variation in the case where silica is included is lower than that of the case where silica is not included. Thus, when silica is included, a difference between the initial adhesive force and the adhesive force under the high temperature condition is not large. Particularly, in Comparative Examples 13 to 17 which do not include silica, the adhesive force under the high temperature condition is remarkably increased than the initial adhesive force. Further, in cases of Comparative Examples 16 and 17 which include hexamethylene diisocyanate of a high concentration while including silica, the adhesive force of the acrylic adhesives are greatly increased, so that the residue is generated under the high temperature condition.

Figure 5:
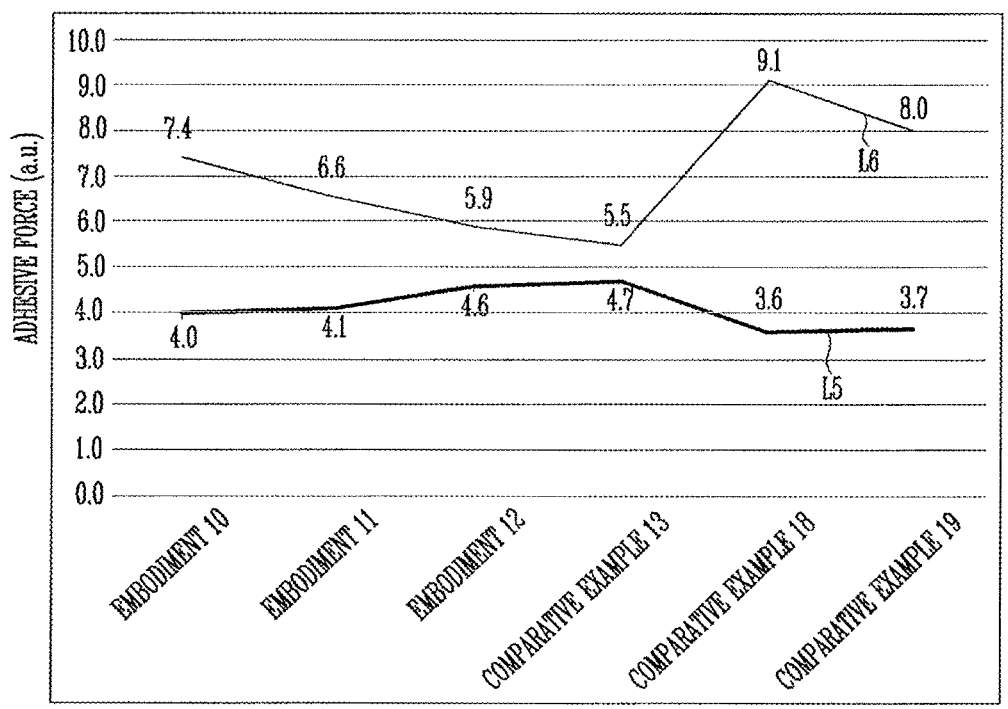
FIG. 5 illustrates a result of Table 3, and is a graph representing measured physical properties of acrylic adhesives prepared in Embodiments 10 to 13, and Comparative Examples 18 and 19.

Table 3 and FIG. 5 represent the result of the measurement of the properties of the acrylic adhesives prepared in Embodiments 10 to 13, and Comparative Examples 18 and 19.

In Table 3 below, adhesive force was measured by using KS M 3725 that is a peeling strength measuring method, viscosity of the adhesive layer was 500 cp, a thickness of the adhesive layer was 20 micrometers, and TSC was 27.5%. In Table 2 below, a result value indicated with "initial" means an initial adhesive force value, and a result value indicated with "85° C. RH85% 3 day" means an adhesive force value under a high temperature condition, and means an adhesive force value after the acrylic adhesive is maintained at 85° C. for three days under the condition of relative humidity of 85%. Further, Residue means a residue left on a surface of an adherend when the protective film is removed from the adherend. Here, the adhesive force and the terms are the same as those described above.

TABLE 3

| | | | Adhesive force (gf/in) | | |
|---|---|---|---|---|---|
| Classification | Mw (ten thousand) | Viscosity (cp) | Initial stage | 85° C. RH85% 3 day | Residue |
| Embodiment 10 | 55.7 | 1630 | 4.0 | 7.4 | Clear |
| Embodiment 11 | 62.2 | 2110 | 4.1 | 6.6 | Clear |
| Embodiment 12 | 79.4 | 4800 | 4.6 | 5.9 | Clear |
| Embodiment 13 | 85.2 | 5600 | 4.7 | 5.5 | Clear |
| Comparative Example 18 | 38.4 | 1400 | 3.6 | 9.1 | Clear |
| Comparative Example 19 | 43.6 | 850 | 3.7 | 8.0 | Clear |

Referring to Table 3, in the acrylic adhesives prepared in Embodiments 10 to 13 of the present disclosure, when molecular weight is about 450,000 to about 900,000, a difference between the initial adhesive force and the adhesive force under the high temperature condition is not large. However, when molecular weight is less than about 450,000, a difference between the initial adhesive force and the adhesive force under the high temperature condition is relatively large.

Table 4 represents a result of the measurement of whether the acrylic adhesives prepared in Embodiments 10 to 13, and Comparative Examples 18 and 19 are transferred.

Here, whether the acrylic adhesives prepared in Embodiments 10 to 13, and Comparative Examples 18 and 19 are transferred was measured by applying the acrylic adhesive on a surface of the protective film (polyethylene terephthalate) with a thickness of 20 micrometers, applying the protective film including the applied acrylic adhesive onto a glass surface, exposing the protective film on the aforementioned high temperature condition (85° C., RH85%, 3 day), peeling the protective film, and then measuring a contact angle and an initial contact angle of the glass surface, from which the protective film is peeled, by using a contact angle measuring device, and then result values were checked.

TABLE 4

| Classification | Initial contact angle of glass surface | Contact angle of glass surface at 85° C., RH85% after 3 days |
|---|---|---|
| Embodiment 10 | 40.1 | 43.1 |
| Embodiment 11 | 42.2 | 44.4 |
| Embodiment 12 | 41.0 | 44.7 |
| Embodiment 13 | 40.8 | 46.8 |
| Comparative Example 18 | 42.5 | 70.0 |
| Comparative Example 19 | 41.8 | 70.4 |

Referring to Table 4, the acrylic adhesives prepared in Embodiments 10 to 13 of the present disclosure exhibit an excellent coating property for the glass surface. Thus, the acrylic adhesives prepared in Embodiments 10 to 13 are in close contact with the glass surface and maintain roughness of the glass surface even under the high temperature condition, and are not transferred to the glass surface during the process of peeling the protective film. Accordingly, the contact angle of the glass surface was not changed much. However, the acrylic adhesives prepared in Comparative Examples 18 and 19 have a poor coating property with the glass surface, so that roughness of the glass surface is decreased under the high temperature condition, and the acrylic adhesive ingredient is transferred to the glass surface during the process of peeling the protective film, so that the contact angle is considerably increased.

Table 5 represents surface tension of the acrylic adhesives prepared in Embodiment 10 and Comparative Example 18.

Here, the surface tension of the acrylic adhesive composition was measured by applying the acrylic adhesives prepared in Embodiments 10 and Comparative Example 18 to the surface of the protective film (polyethylene terephthalate) in a thickness of 20 micrometers, applying the protective film including the applied acrylic adhesive to a glass surface, peeling the protective film after the exposure to a high temperature condition (85° C., RH85%, 3 day), and then applying a dyne pen to the glass surface from which the protective film is peeled.

TABLE 5

| Classification | Dyne |
| --- | --- |
| Embodiment 10 | 36 OK |
| Comparative Example 18 | 30 NG |

Figure 6A:
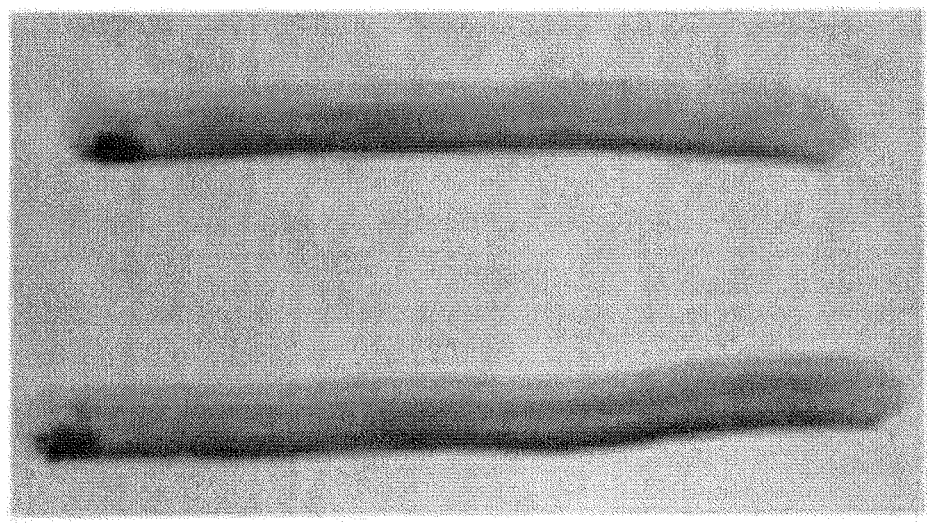
FIGS. 6A and 6B illustrate pictures illustrating results of an application of a dyne pen to Embodiments 10.
Figure 6B:
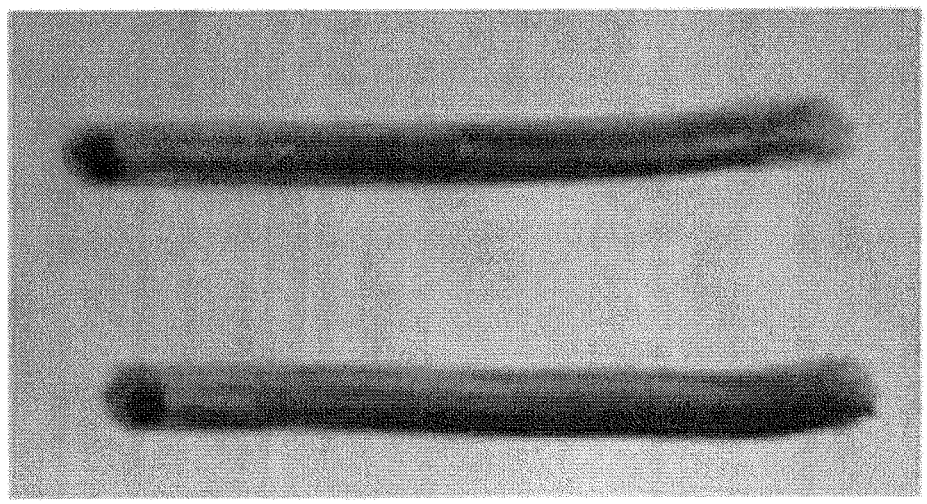
Figure 6C:
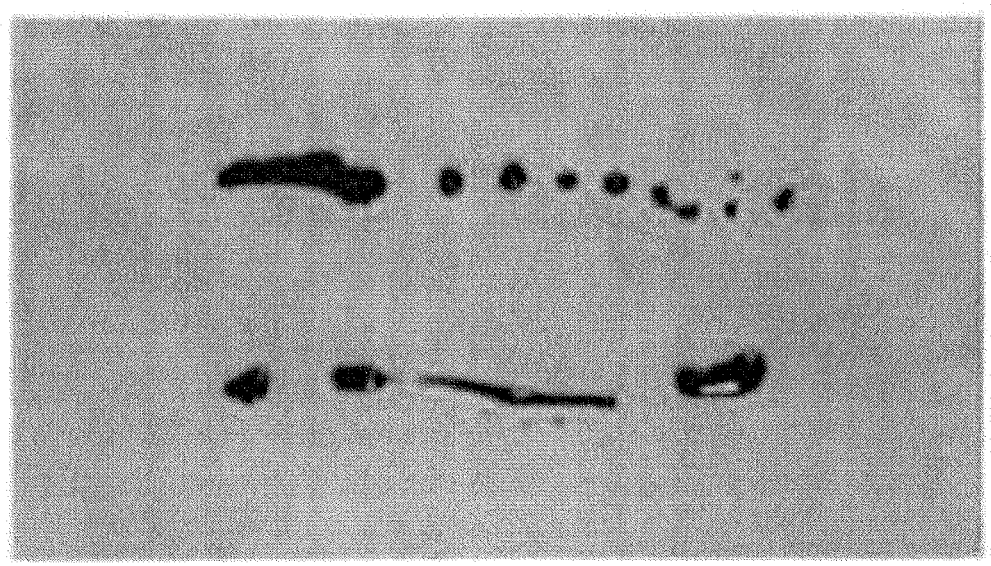
FIGS. 6C and 6D illustrate pictures illustrating results of an application of a dyne pen to Comparative Example 18.
Figure 6D:
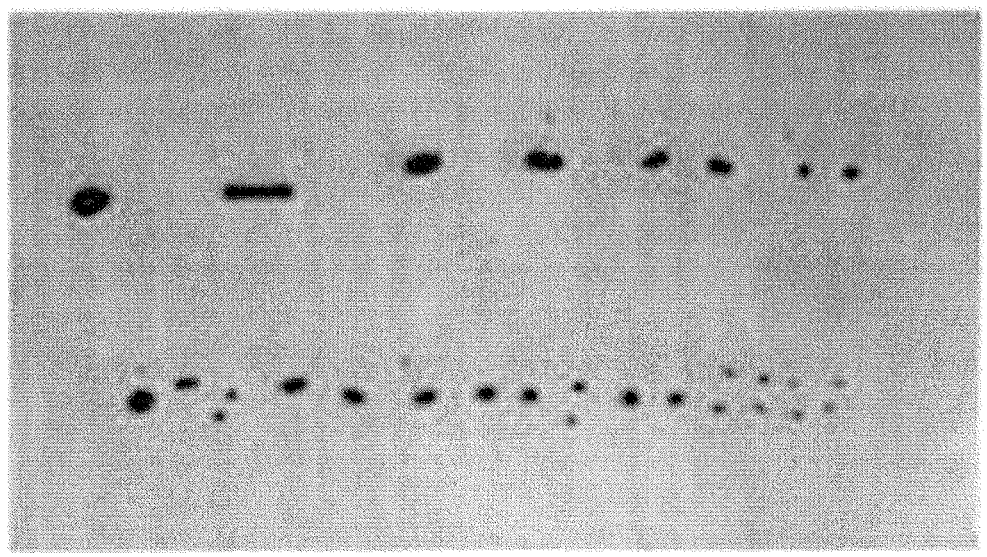

FIGS. 6A and 6B are pictures illustrating results of an application of a dyne pen to Embodiment 10, and FIGS. 6C and 6D are pictures illustrating results of an application of a dyne pen to Comparative Example 18.

Referring to Table 5, and FIGS. 6A to 6D, it can be seen that the acrylic adhesive prepared in Embodiment 10 of the present disclosure satisfies 36 dyne in a dyne pen test, but the acrylic adhesive prepared in Comparative Example 18 does not satisfy even 30 dyne.

Table 6 below represents a result of the measurement of surface resistance of the acrylic adhesives prepared in Embodiment 1, 14, and 15.

TABLE 6

| Classification | Surface resistance ($\Omega/m^2$) |
| --- | --- |
| Embodiment 1 | $1 \times 10^6$ |
| Embodiment 14 | $1 \times 10^7$ |
| Embodiment 15 | $1 \times 10^8$ |

As represented in Table 6, it can be seen that the acrylic adhesives prepared in Embodiment 1, 14, and 15 of the present disclosure have small surface resistance values, thereby exhibiting an excellent anti-static effect.

Figure 7:
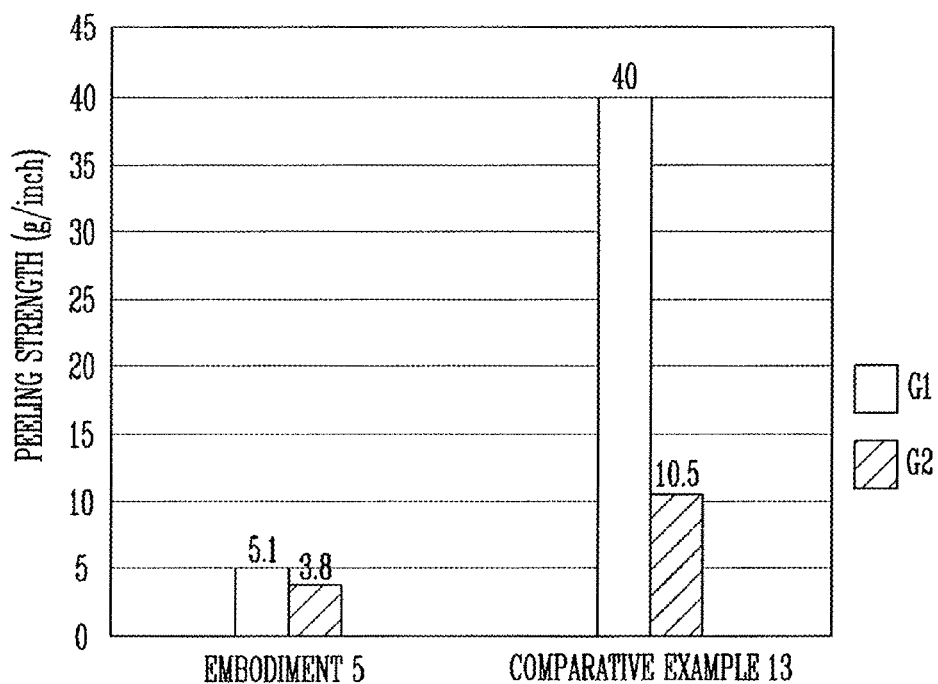
FIG. 7 illustrates a diagram representing result values of a measurement of peeling strength of acrylic adhesives prepared in Embodiment 5 and Comparative Example 13.

FIG. 7 is a diagram representing result values of a measurement of peeling strength of the acrylic adhesives prepared in Embodiment 5 and Comparative Example 13.

The peeling strength was measured by using an Atomic Force Microscope (AFM), and was measured by applying transparent glass and black glass. Here, the transparent glass is a glass substrate, of which an RMS roughness is 0.64, and is free from a polishing process, and the black glass is a glass substrate, of which an RMS roughness is 0.43, and is free from a polishing process. The transparent glass and the black glass are the names for convenience, and do not mean that transparent glass is actually transparent and the black glass actually has a black color. In FIG. 7, the transparent glass is indicated with G1, and the black glass is indicated with G2.

Referring to FIG. 7, the acrylic adhesives prepared in Embodiments 5 have low peeling strength, and have low variableness in adhesive strength according to surface roughness of a target to which the acrylic adhesive is applied.

Figure 8:
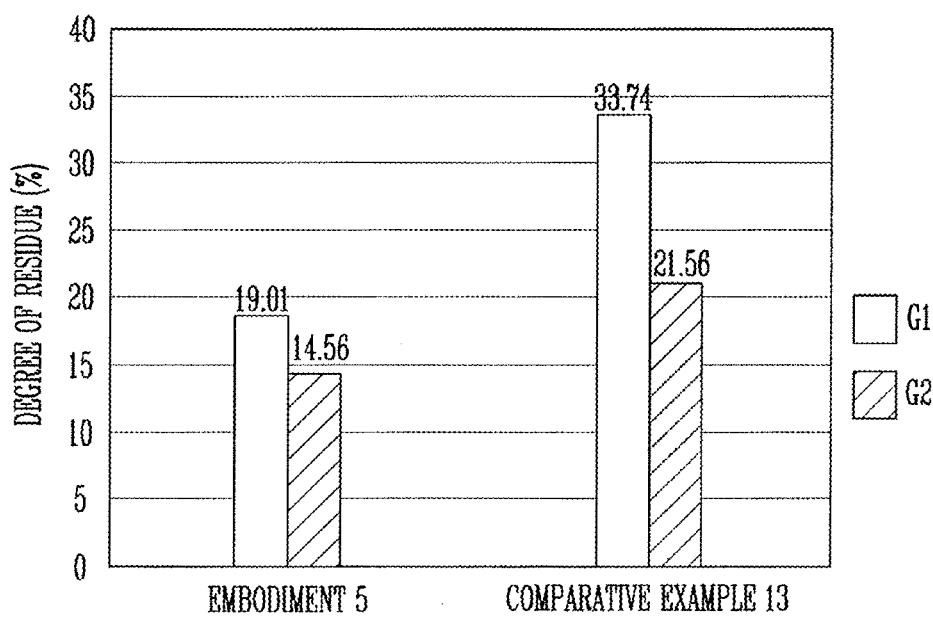
FIG. 8 illustrates a diagram representing a result value of Table 7, and is a graph representing the measured degrees of remaining of acrylic adhesives prepared in Embodiment 5 and Comparative Example 13.

Table 7 represents a result of a measurement of the degree of residue of the acrylic adhesives prepared in Embodiment 5 and Comparative Example 13. FIG. 8 is a graph illustrating the result values of Table 7. In FIG. 8, the transparent glass is indicated with G1, and the black glass is indicated with G2.

Here, the degree of residue was measured by using an X-ray Photoelectron Spectroscopy (XPS), and is represented based on the amount of carbon atoms detected after the acrylic adhesive is applied to the transparent glass and the black glass, and 2.0 is an average value.

TABLE 7

| Classification | Kind of glass | Peel-off (gf/inch) | C1s | N1s | O1s | F1s | Na1s | Mg2s | Al2p | Si2p | P2p | K2p |
| --- | --- | --- | --- | --- | --- | --- | --- | --- | --- | --- | --- | --- |
| Embodiment 5 | Transparent glass | 5.1 | 19.01 | 0.75 | 52.70 | 0.20 | 1.93 | 0.35 | 5.51 | 13.98 | 1.98 | 3.63 |
| Comparative example 13 | Transparent glass | 40 | 33.74 | 0.68 | 42.87 | 0.59 | 2.54 | 0.25 | 4.24 | 11.32 | 1.36 | 2.44 |
| Embodiment 5 | Black glass | 3.8 | 14.56 | 0.45 | 54.03 | 0.43 | 3.73 | 0.76 | 7.36 | 13.85 | 1.77 | 3.07 |
| Comparative Example 13 | Black glass | 10.5 | 21.56 | 0.83 | 49.82 | 0.00 | 3.18 | 1.01 | 5.13 | 13.10 | 2.37 | 3.03 |

Referring to Table 7 and FIG. 8, the degree of residue of the acrylic adhesive for the protective film for the surface of the display device prepared in Embodiment 5 is low with respect to both the transparent glass and the black glass.

Figure 9:
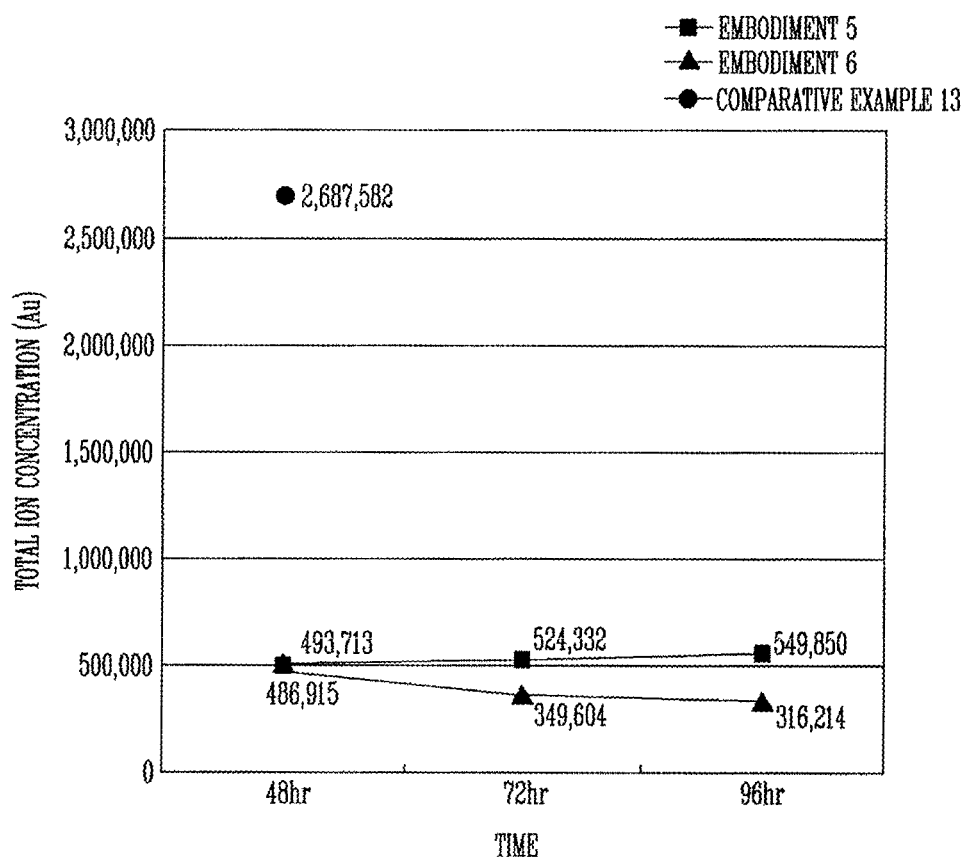
FIG. 9 illustrates a graph illustrating result values of a measurement of total ion concentrations of acrylic adhesives prepared in Embodiments 5 and 6 and Comparative Example 5.

FIG. 9 is a graph illustrating result values of a measurement of total ion concentrations of the acrylic adhesives prepared in Embodiments 5 and 6 and Comparative Example 5.

Here, the total ion concentration was measured by using Liquid Chromatograph (LC)/Mass Spectrometer (MS).

Referring to FIG. 9, it can be seen that the total ion concentration of the acrylic adhesive prepared in Embodiment 5 is remarkably lower than that of the acrylic adhesive prepared in Comparative Example 13.

By way of summation and review, a protective film applied to a product is attached to an adherend, that is, the product, and passes all or a part of a processing process of the adherend. The protective film may prevent a scratch of a surface and/or prevent foreign substances from being attached to the surface during the process until a material of the display device becomes a complete product, and helps the material of the display device to be easily treated.

An adhesive force of the typical adhesives applied to the protective film is generally increased much after a high-temperature compression, so that initial adhesive force should be designed to have a predetermined level or lower in consideration of the increase width of the adhesive force. However, in order to design initial adhesive force of the acrylic adhesive for the protective film to have the predetermined level or lower, a preparing process of the acrylic adhesive may be complex, and initial adhesive force of the acrylic adhesive may be decreased, so that the protective film may be easily separated from the surface of the electronic product.

As described above, the protective film according to embodiments may provide appropriate adhesive force when is initially laminated with an adherend; also, an increase in adhesive force of the protective film is minimized after a process, such as high temperature compression. Accordingly, the acrylic adhesive of the present disclosure may be used for a protective film applied to various devices, as well as a protective film used in a display device. Further, although not for the protective film, when peeling is required after bonding, the usage of the acrylic adhesive is not particularly limited.

For example, the adhesive according to the present example embodiment and the protective film including the same may be applied to a circuit board of an electronic product and the like. The protective film is bonded with appropriate adhesive force when is initially laminated on a circuit board, and may minimize an increase in adhesive force in a high temperature compression process and prevents an etchant and a plating solution from permeating during an etching process and a plating process. Further, the protective film may be prevented from being peeled, wrinkled, and damaged during a circuit board process or a movement of the circuit board.

The acrylic adhesive according to embodiments uses the acrylic monomers, the azo initiator, the filler, and the like, which may provide enhanced reworkability and wetting properties, and lower an aging rate at a high temperature. Accordingly, the acrylic adhesive according to embodiments may not damage a surface of a product during a process of separating a protective film from an electronic product, and the like, and may not be transferred to the surface of the product.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An acrylic adhesive composition, comprising:
an acrylic polymer obtained by polymerizing a mixture of 160 parts by weight to about 250 parts by weight of acrylic monomers with about 0.1 parts by weight to about 1 parts by weight of an azo initiator,
about 0.5 parts by weight to 0.7 parts by weight of porous silica,
about 1.5 parts by weight to about 2.5 parts by weight of a crosslinking agent, and
about 0.5 parts by weight to about 1 parts by weight of an anti-static agent, wherein
the porous silica has a particle size of 0.1 to 1 micrometer.

2. The acrylic adhesive composition as claimed in claim 1, wherein the acrylic monomers include 2-ethylhexylacrylate and 2-(2-ethoxyethoxy)ethyl acrylate.

3. The acrylic adhesive composition as claimed in claim 2, wherein the acrylic monomers include about 100 parts by weight of the 2-ethylhexylacrylate and about 5 parts by weight to about 45 parts by weight of the 2-(2-ethoxyethoxy)ethyl acrylate.

4. The acrylic adhesive composition as claimed in claim 2, wherein the acrylic monomers further include butylacrylate.

5. The acrylic adhesive composition as claimed in claim 4, wherein the acrylic monomers include about 10 parts by weight to about 60 parts by weight of the butylacrylate.

6. The acrylic adhesive composition as claimed in claim 4, wherein the acrylic monomers further include hydroxyethylacrylate.

7. The acrylic adhesive composition as claimed in claim 6, wherein the acrylic monomers include about 4 parts by weight to about 45 parts by weight of the hydroxyethylacrylate.

8. The acrylic adhesive composition as claimed in claim 1, wherein weight average molecular weight of the acrylic polymer is about 450,000 to about 900,000.

9. The acrylic adhesive composition as claimed in claim 1, wherein the azo initiator is 2,2'-azobisisobutyronitrile.

10. The acrylic adhesive composition as claimed in claim 1, wherein the crosslinking agent includes isocyanate.

11. A protective film, comprising:
a support film; and
an acrylic adhesive layer provided on at least one surface of the support film, the acrylic adhesive layer being formed from the acrylic adhesive composition as claimed in claim 1.

12. The protective film as claimed in claim 11, wherein the acrylic monomers include 2-ethylhexylacrylate, 2-(2-ethoxyethoxy)ethyl acrylate, butylacrylate, and hydroxyethylacrylate.

13. The protective film as claimed in claim 12, wherein the acrylic monomers include about 100 parts by weight of the 2-ethylhexylacrylate, about 5 parts by weight to about 45 parts by weight of the 2-(2-ethoxyethoxy)ethyl acrylate, about 10 parts by weight to about 60 parts by weight of the butylacrylate, and about 4 parts by weight to about 45 parts by weight of the hydroxyethylacrylate.

14. The protective film as claimed in claim 11, wherein weight average molecular weight of the acrylic polymer is about 450,000 to about 800,000.

15. The protective film as claimed in claim 11, further comprising:
a release film provided on the acrylic adhesive layer.

16. The protective film as claimed in claim 15, further comprising:
an anti-static layer provided between the acrylic adhesive layer and the support film.

17. A display device, comprising:
a display panel; and
the protective film as claimed in claim 11 provided on the display panel.

18. The display device as claimed in claim 17, wherein the acrylic monomers include 2-ethylhexylacrylate, 2-(2-ethoxyethoxy)ethyl acrylate, butylacrylate, and hydroxyethylacrylate.

19. The display device as claimed in claim 18, wherein the acrylic monomers include about 100 parts by weight of the 2-ethylhexylacrylate, about 5 parts by weight to about 45 parts by weight of the 2-(2-ethoxyethoxy)ethyl acrylate, about 10 parts by weight to about 60 parts by weight of the butylacrylate, and about 4 parts by weight to about 45 parts by weight of the hydroxyethylacrylate.

20. The display device as claimed in claim 17, wherein the acrylic polymer has a weight average molecular weight of about 450,000 to about 900,000.

* * * * *